US012503121B2

(12) United States Patent
Reints et al.

(10) Patent No.: US 12,503,121 B2
(45) Date of Patent: Dec. 23, 2025

(54) DRIVING SIMULATOR TESTING FOR DETERMINING THE FUNCTIONAL IMPACT OF PERIPHERAL OPTICAL ERRORS

(71) Applicant: AMO Groningen B.V., Groningen (NL)

(72) Inventors: Roy Reints, Meerstad (NL); Marrie van der Mooren, Engelbert (NL); Carmen Canovas Vidal, Groningen (NL); Johan Le Brun, Paris (FR); Julien Adrian, Cormeilles en Parisis (FR); Tanguy Séron-Camps, Paris (FR); Chloé Pagot, Paris (FR); Christopher Reeves, Tuffe val de la Cheronne (FR); Robert Rosen, Groningen (NL)

(73) Assignee: AMO Groningen B.V., Groningen (NL)

( * ) Notice: Subject to any disclaimer, the term of this patent is extended or adjusted under 35 U.S.C. 154(b) by 273 days.

(21) Appl. No.: 18/478,750

(22) Filed: Sep. 29, 2023

(65) Prior Publication Data

US 2024/0109543 A1    Apr. 4, 2024

Related U.S. Application Data

(60) Provisional application No. 63/377,697, filed on Sep. 29, 2022.

(51) Int. Cl.
*B60W 40/09* (2012.01)
*B60K 35/00* (2024.01)
(Continued)

(52) U.S. Cl.
CPC ............. *B60W 40/09* (2013.01); *B60K 35/00* (2013.01); *B60W 40/072* (2013.01);
(Continued)

(58) Field of Classification Search
CPC .... B60W 40/09; B60W 40/072; B60W 50/14; B60W 2040/0818; B60W 2050/146;
(Continued)

(56) References Cited

U.S. PATENT DOCUMENTS

2015/0187224 A1  7/2015  Moncrief et al.
2015/0320547 A1  11/2015  Rosen et al.
(Continued)

FOREIGN PATENT DOCUMENTS

| EP | 3752045 B1 | 11/2021 |
| JP | 6206949 B2 | 10/2017 |
| WO | 2007048615 A1 | 5/2007 |

OTHER PUBLICATIONS

Liou H.L., et al., "Anatomically Accurate, Finite Model Eye for Optical Modeling," Journal of Optical Society of America, Aug. 1997, vol. 14 (8), pp. 1684-1695.
(Continued)

*Primary Examiner* — Brian A Zimmerman
*Assistant Examiner* — Cal J Eustaquio

(57) ABSTRACT

A method of quantifying the effect of peripheral optical errors on driving includes displaying, on a central portion of a display, a visual representation of a vehicle on a dynamic roadway; intermittently displaying a curve in the dynamic roadway; intermittently displaying, on a peripheral portion of the display, a target object; receiving a signal in response to a participant viewing the target object; determining a reaction time and determining target detection accuracy. Another method includes displaying a participant vehicle and a lead vehicle in front of the participant vehicle on a roadway; signaling an alert when the participant vehicle is outside of a distance range to the lead vehicle; intermittently displaying, on a peripheral portion of the display, a target object; receiving a signal in response to a participant detect-
(Continued)

ing the target; and quantifying the effect of the peripheral optical errors based on reaction time and target detection accuracy.

12 Claims, 5 Drawing Sheets

(51) Int. Cl.
  *B60K 35/29* (2024.01)
  *B60W 40/072* (2012.01)
  *B60W 40/08* (2012.01)
  *B60W 50/14* (2020.01)

(52) U.S. Cl.
  CPC ............. *B60W 50/14* (2013.01); *B60K 35/29* (2024.01); *B60K 2360/188* (2024.01); *B60W 2040/0818* (2013.01); *B60W 2050/146* (2013.01); *B60W 2540/229* (2020.02); *B60W 2552/30* (2020.02); *B60W 2554/4026* (2020.02); *B60W 2554/4029* (2020.02); *B60W 2554/4041* (2020.02); *B60W 2554/802* (2020.02)

(58) Field of Classification Search
  CPC ....... B60W 2540/229; B60W 2552/30; B60W 2554/4026; B60W 2554/4029; B60W 2554/4041; B60W 2554/802; B60K 35/00; B60K 35/29; B60K 2360/188; G09B 9/052
  See application file for complete search history.

(56) References Cited

U.S. PATENT DOCUMENTS

| | | |
|---|---|---|
| 2017/0258578 A1 | 9/2017 | Rosen et al. |
| 2017/0273552 A1 | 9/2017 | Leung et al. |
| 2021/0045628 A1 | 2/2021 | Bennett et al. |
| 2022/0392370 A1 | 12/2022 | Kweon et al. |
| 2024/0111383 A1 | 4/2024 | Reints et al. |
| 2024/0374375 A1 | 11/2024 | Romashchenko et al. |

OTHER PUBLICATIONS

Atchison, David A., "Optical Models for Human Myopic Eyes", Vision Research, vol. 46, pp. 2236-2250, 2006.

ISO 11979-1, "Part 1—Vocabulary", Ophthalmic Implants—Intraocular Lenses, Edition 4, 16 pages, Nov. 2018.

ISO 11979-2, "Part 2—Optical Properties and Test Methods", Ophthalmic Implants—Intraocular Lenses, Edition 2, 30 pages, Aug. 15, 2014.

Gomaa A., et al., "Studying Person-Specific Pointing and Gaze Behavior for Multimodal Referencing of Outside Objects from a Moving Vehicle," ICMI '20: Proceedings of the 2020 International Conference on Multimodal Interaction, Oct. 2020, pp. 501-509, XP058483095, DOI: 10.1145/3382507.3418817 ISBN: 978-1-4503-7581-8.

Graci V., et al., "Peripheral Visual Cues Affect Minimum-foot-clearance During Overground Locomotion," Gait & Posture, Oct. 2009, vol. 30(3), pp. 370-374. XP026467570, ISSN: 0966-6362, DOI: 10.1016/j.gaitpost.2009.06.011.

Jansen S.E.M., et al., "Human Locomotion Through a Multiple Obstacle Environment: Strategy Changes as a Result of Visual Field Limitation," Experimental Brain Research, Jul. 2011, vol. 212(3), pp. 449-456. XP019924746, ISSN: 1432-11 06, DOI: 10.1007/S00221-011-2757-1.

Knopf N.A., et al., "Initial Mobility Behaviors of People With Visual Impairment in a Virtual Environment Using a Mixed Methods Design," 2017 IEEE Life Sciences Conference (LSC), Dec. 2017, pp. 153-156, XP033307043, DOI: 10.1109/LSC.2017.8268166.

Miyasike-Dasilva V., et al., "A Role for the Lower Visual Field Information in Stair Climbing," Gait & Posture, May 2019, vol. 70, pp. 162-167, XP085662176, ISSN: 0966-6362, DOI: 10.1016/j.gaitpost.2019.02.033.

DRIVING SIMULATOR TESTING FOR DETERMINING THE FUNCTIONAL IMPACT OF PERIPHERAL OPTICAL ERRORS

CROSS-REFERENCE TO RELATED PATENT APPLICATIONS

This application claims priority to U.S. Provisional Application No. 63/377697, filed on Sep. 29, 2022, which is hereby incorporated by reference in its entirety.

BACKGROUND

Field

The present disclosure relates to various systems and methods for determining the impact of peripheral optical errors on patient driving.

Description of the Related Art

Peripheral vision plays a crucial role in safe driving. When peripheral vision is reduced or impaired, driving can be negatively affected. For instance, peripheral optical errors in a driver's vision can cause the driver not to recognize or notice pedestrians or cyclists in the driver's periphery. Alternatively, the peripheral optical errors may increase the driver's reaction time in recognizing or noticing pedestrians or cyclists in the driver's periphery, which may not give the driver sufficient braking distance to avoid a collision with the pedestrian or the cyclist.

SUMMARY

The present disclosure relates to various systems and methods for determining the impact or effect of peripheral optical errors (aberrations) on a patient's driving ability, such as the patient's ability to quickly and accurately identify potential hazards, such as pedestrians or cyclists. In one embodiment, the method includes displaying, on a central portion of at least one display of a driving simulator, a visual representation of a vehicle on a dynamic roadway. The method also includes intermittently displaying, on the central portion of the at least one display, a curve of a number of curves in the dynamic roadway, and intermittently displaying, on a peripheral portion of the at least one display of the driving simulator, a target object of a number of target objects. The method further includes receiving, from an indicator in the driving simulator, a signal in response to a participant viewing the target object in the peripheral portion of the at least one display, and determining, by a processor of the driving simulator, a reaction time between the displaying of the target object and the receiving of the signal, and determining, by the processor of the driving simulator, target detection accuracy as a ratio of a number of target objects correctly detected by the participant to a total number of the plurality of target objects displayed. The method also includes quantifying the effect of the peripheral optical errors on driving based on the reaction time and the target detection accuracy.

In another embodiment, the method includes displaying, on central portion of at least one display of a driving simulator, a participant vehicle and a lead vehicle in front of the participant vehicle on a roadway, and signaling an alert, with the driving simulator, when the participant vehicle is outside of a distance range to the lead vehicle. The method also includes intermittently displaying, on a peripheral portion of the at least one display of the driving simulator, a target object, and receiving, from an indicator in the driving simulator, a signal in response to a participant viewing a target in the periphery of the display. The method also includes determining, by a processor of the driving simulator, a reaction time between the displaying of the target object and the receiving of the signal, and determining, by the processor of the driving simulator, target detection accuracy as a ratio of a number of target objects correctly detected by the participant to a total number of the plurality of target objects displayed. The method also includes quantifying the effect of the peripheral optical errors on driving based on the reaction time and the target detection accuracy.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features or tasks may be combined with one or more other described features or tasks to provide a workable system, device, or method.

BRIEF DESCRIPTION OF THE DRAWINGS

The accompanying drawings, together with the specification, illustrate exemplary embodiments of the present disclosure, and, together with the description, serve to explain the principles of the present disclosure. The drawings are not necessarily drawn to scale.

DETAILED DESCRIPTION

The present disclosure relates to various systems and methods for determining the impact of peripheral optical errors (aberrations) on a patient's driving (e.g., driving in urban or rural environments), such as the patient's accuracy and reaction time in identifying objects (such as pedestrians or cyclists) in the patient's peripheral vision. The peripheral optical errors may be caused, for example, by the individual's natural lenses, contact lenses, or intraocular lenses (IOLs). The systems and methods of the present disclosure are configured to generate a first task to occupy the participant's central vision during the performance of a second task that requires utilization of the subject's peripheral vision. In this manner, the systems and methods of the present disclosure isolate the effect of the peripheral optical errors on the participant's driving ability. The impact of the peripheral optical errors may then be utilized to compare the function of two or more different lens designs, such as group-wise comparisons between different lens models. In this manner, the functional improvement of a new lens design (e.g., a news lens design that is designed to improve peripheral vision up to phakic levels) over an existing lens design may be demonstrated. Additionally, in one or more embodiments, the impact of the peripheral optical errors may be utilized to develop glasses, contact lenses, or IOLs for the individual that reduce the effect of the peripheral optical errors on the individual's driving. Additionally, in one or more embodiments in which the individual already has IOLs, the impact of the peripheral optical errors determined according to the systems and methods of the present disclosure may be utilized to modify or redesign the IOL or to select a piggyback IOL having a different configuration to reduce the impact of the peripheral optical errors on the individual's driving.

Figure 1A:
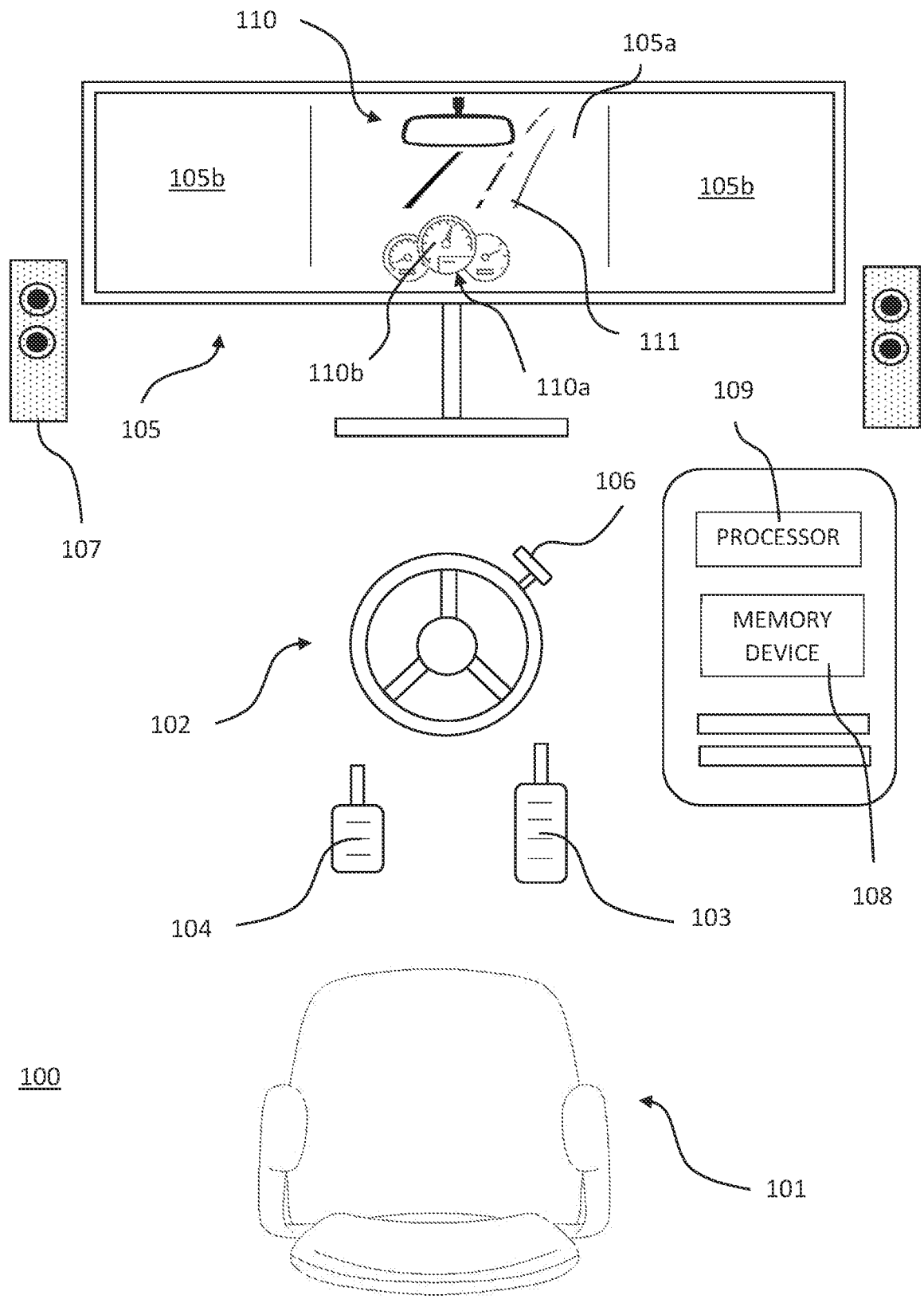
FIG. 1A is a schematic block diagram of a driving simulator system according to one embodiment of the present disclosure for determining the impact of peripheral optical errors on patient driving.

With reference now to FIG. 1A, a driving simulator system 100 according to one embodiment of the present disclosure includes a seat 101, a steering wheel 102, an acceleration pedal 103, a brake pedal 104, a display 105 (e.g., three monitors or screens creating a substantially 180-degree view for the participant) in front of the seat 101, an indicator 106 (e.g., a button, a switch, or a paddle) on the steering wheel 102, and a speaker(s) 107. The driving simulator system 100 also includes a non-volatile memory device 108 having instructions (e.g., computer-readable code) stored therein, and a processor 109 coupled to the non-volatile memory device 108. The processor 109 is configured to receive inputs from the steering wheel 102, the acceleration pedal 103, and the brake pedal 104. In response to the inputs from the steering wheel 102, the acceleration pedal 103, and the brake pedal 104, the processor 109 is configured to transmit an output signal to control the content displayed on the display 105.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example, a processor may include two processors, an FPGA and a CPU, interconnected on a PWB.

In one or more embodiments, the instructions stored in the non-volatile memory device 108, when executed by a processor 109, cause the driving simulator system 100 to display, on the display 105, a dynamic visual representation of a driving scene including a participant vehicle 110 (e.g., a car) (or a portion thereof) to be virtually driven by a participant and a roadway 111 on a central portion 105a (or a central screen) of the display 105, and surrounding environment (e.g., trees and/or buildings) on peripheral portions 105b (or peripheral screens) of the display 105 on opposite sides of the central portion 105a (or the central screen) of the display 105. The visual representation of the participant's vehicle 110 includes an instrument panel 110a, including a speedometer 110b displaying the current speed of the participant's vehicle 110. The instructions stored in the memory device 108, when executed by the processor 109, cause the driving simulator system 100 to change the driving scene displayed on the display 105 in response to the inputs from the steering wheel 102, the acceleration pedal 103, and the brake pedal 104 by the participant. For instance, the instructions stored in the memory device 108, when executed by the processor 109, cause the driving simulator system 100 to change the position of the participant's vehicle 110 on the roadway 111 (e.g., move the visual representation of the participant's vehicle 110 to the left or the right with respect to the roadway 111, such as to change lanes) in response to inputs into the steering wheel 102, and/or to increase or decrease the speed at which the participant's vehicle 100 moves relative to the roadway 111 in response to inputs to the acceleration pedal 103 and the brake pedal 104, respectively.

Figure 1B:
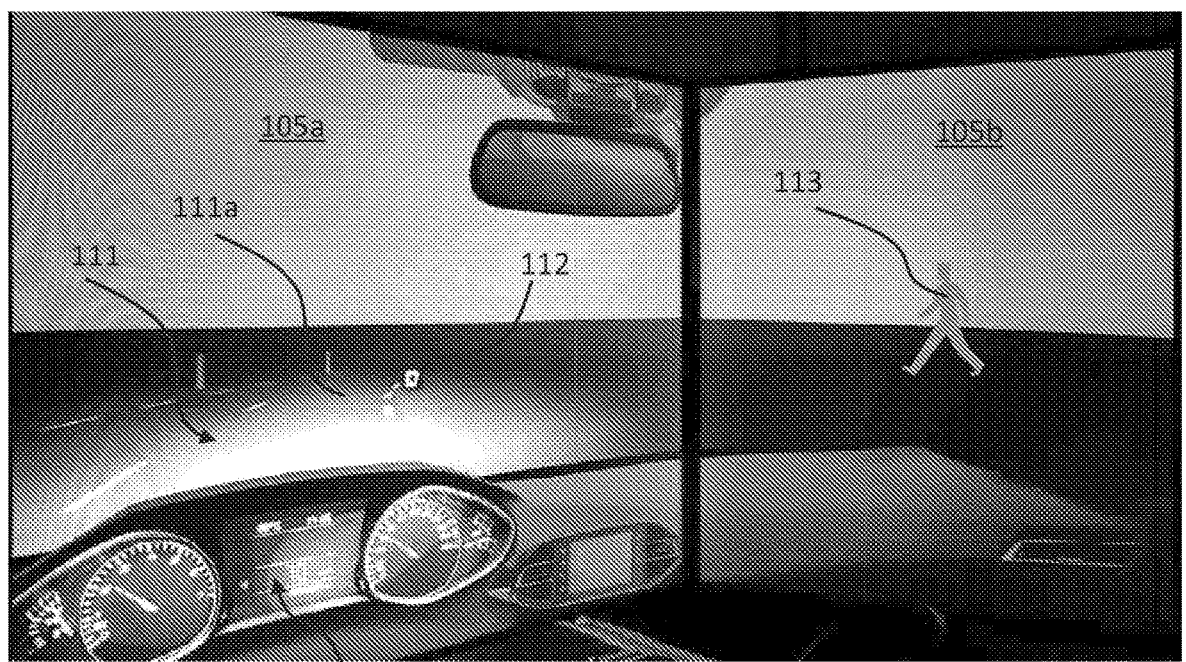
FIGS. 1B-1C depict a display of the driving simulator system according to various embodiments of the present disclosure.

In the embodiment illustrated in FIG. 1B, the instructions stored in the non-volatile memory device 108, when executed by the processor 109, cause the driving simulator system 100 to intermittently (e.g., randomly or periodically) display, on the central portion 105a (or the central screen) of the display 105, curves 111a in the roadway 111 (e.g., 90-degree or approximately 90-degree turns or bends alternately to the left and to the right, with straight or substantially straight segments between the turns). In the illustrated embodiment, the instructions stored in the non-volatile memory device 108, when executed by the processor 109, cause the driving simulator system 100 to display, on the central portion 105a (or a central screen) of the display 105, one or more characters 112 overlaid on (or adjacent or proximate to) each of the curves 111a in the roadway 111 (e.g., one or more characters displayed at a tangent point of each of the bends in the roadway 111). For example, in one or more embodiments, the instructions stored in the non-volatile memory device 108, when executed by the processor 109, cause the driving simulator system 100 to display, on the central portion 105a (or the central screen) of the display 105, a numerical countdown (e.g., from 3 to 2 to 1) overlaid on (or adjacent or proximate to) each curve 111a in the roadway 111 and then letters (e.g., random or pseudo-random letters) overlaid on (or adjacent or proximate to) each curve 111a in the roadway 111 after the numerical countdown reaches 1 and/or after the numerical countdown is no longer displayed. In one or more embodiments, the instructions stored in the non-volatile memory device 108, when executed by the processor 109, cause the driving simulator system 100 to emit from the speaker(s) 107 an audible alert coinciding with the display of the numerical countdown (e.g., a beep emitted when each of the numbers 3, 2, and 1 are displayed).

In one or more embodiments, the instructions stored in the non-volatile memory device 108, when executed by the processor 109, cause the driving simulator system 100 to intermittently display, on the peripheral portion 105b (or the peripheral screen) of the display 105, a target object 113 while a curve 111a in the roadway 111 is displayed on the central portion 105a (or the central screen) of the display 105 (e.g., while the one or more characters 112 are displayed on the central portion 105a (or the central screen) of the display 105). As described in more detail below, the display of the target objects 113 in the peripheral portion 105b (or the peripheral screen) of the display 105 is configured to test the participant's peripheral vision and thus the effect of the peripheral optical errors (aberrations) (e.g., peripheral optical errors in an individual's natural lens, contact lens, or an IOL) on the participant's ability to timely and accurately detect the target objects 113 while driving. In one or more embodiments, the target object 113 may be, for example, a visual representation of a pedestrian or a cyclist. In one or more embodiments, the target object 113 may be static (e.g., fixed at a particular location on the peripheral portion 105*b* (or the peripheral screen) of the display 105) or dynamic (e.g., the target object 113 may move laterally inward). In one or more embodiments, the instructions stored in the non-volatile memory device 108, when executed by the processor 109, cause the driving simulator system 100 to display the target objects 113 on fewer than all of the curves 111*a* to prevent the participant from anticipating the presence of the target objects 113 in the periphery of the participant's visual field of view (e.g., in one or more embodiments, the driving simulator system 100 may be configured not to display a target object 113 in the peripheral portion 105*b* (or a peripheral screen) of the display 105 every time a curve 111*a* in the roadway 111 is displayed on a central portion 105*a* (or a central screen) of the display 105).

As described in more detail below, the identification of the one or more characters 112 (and, optionally, the numerical countdown) on the central portion 105*a* (or the central screen) of the display 105 requires use of the participant's central vision, and the detection of the target objects 113 in the peripheral portion 105*b* (or the peripheral screen) of the display 105 require use of the participant's peripheral vision. In this manner, the simultaneous or substantially simultaneous display of the one or more characters 112 (and, optionally, the numerical countdown) and the one or more target objects 113 on the central portion 105*a* (or the central screen) and the peripheral portion 105*b* (or the peripheral screen), respectively, of the display 105 prevents (or at least mitigates against) the participant utilizing his or her central vision to identify the target objects 113 in the peripheral portion 105*b* (or the peripheral screen) of the display 105. That is, the driving simulator system 100 requires the participant to perform dual-tasks simultaneously (or substantially simultaneously), with one task requiring the participant's central vision to perform and the other task requiring the participant's peripheral vision to perform, which isolates the effects of the peripheral optical errors (aberrations) on the participant's peripheral vision.

In one or more embodiments, the processor 109 of the driving simulator system 100 is configured to determine (e.g., measure or calculate) the reaction time between the display of a character 112 at one of the curves 111*a* in the roadway 111 and the input received when the indicator 106 is activated by the participant (e.g., the button is depressed, the switch is flipped, or the paddle is pressed). Additionally, in one or more embodiments, the processor 109 of the driving simulator system 100 is configured to determine a ratio of the number of target objects 113 detected by the participant (as indicated by activation of the indicator 106) to the total number of target objects 113 displayed in the peripheral portion 105*b* (or the peripheral screen) of the display 105 (e.g., the participant's accuracy in detecting the target objects 113). As described in more detail below, the greater the reaction time and the greater number of target objects that are not detected (i.e., missed) by the participant, the greater the extent of the impact of the peripheral optical errors on the participant's driving ability.

Figure 1C:
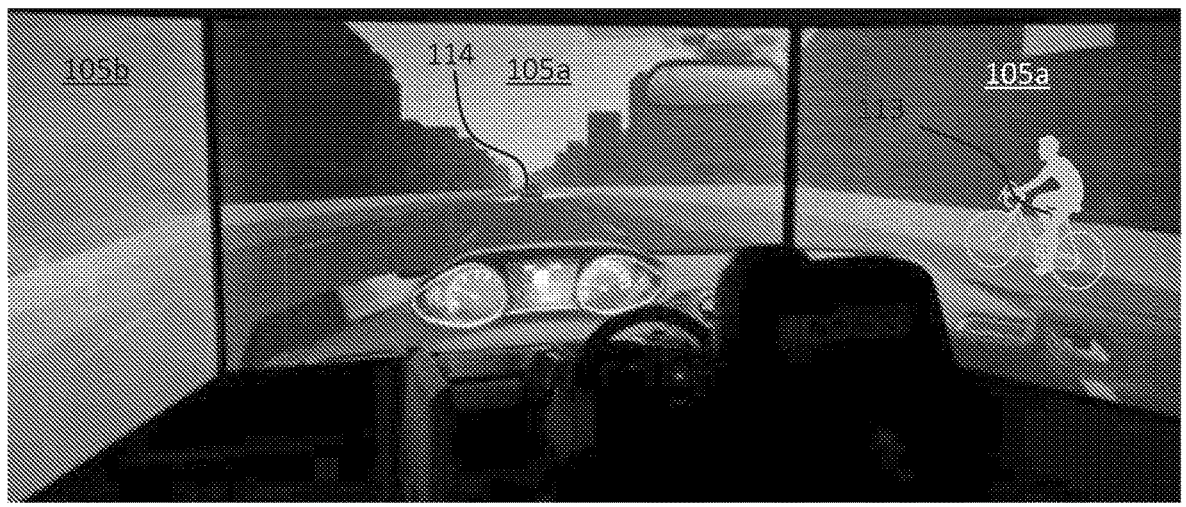
Figure 1C:
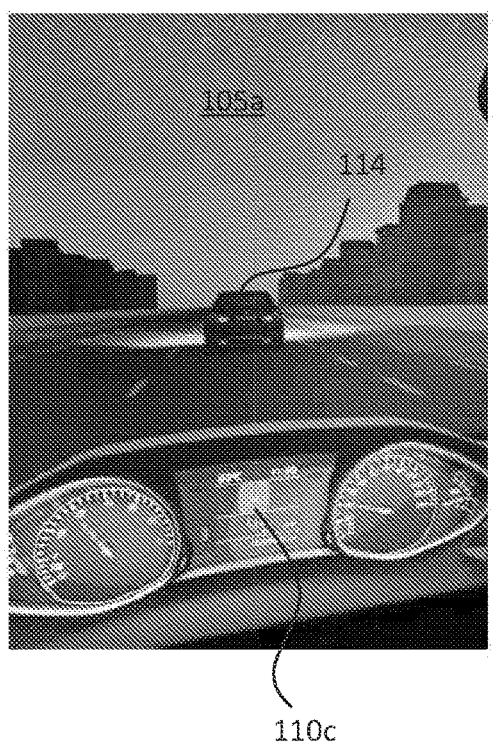
Figure 1C:
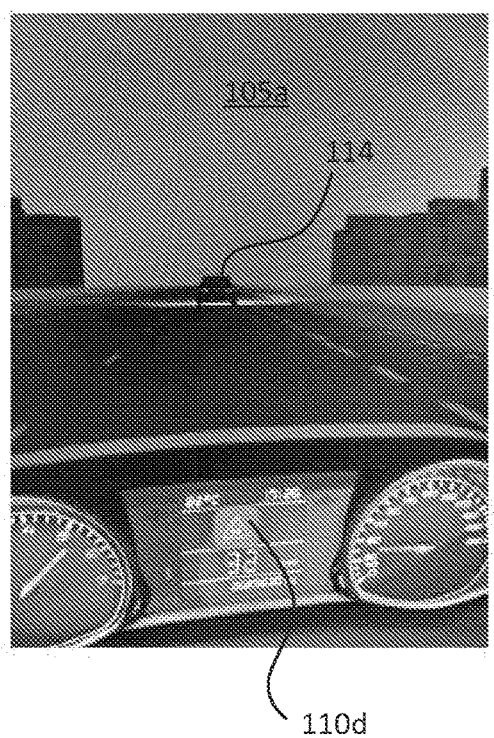

With reference now to the embodiment illustrated in FIG. 1C, the instructions stored in the non-volatile memory device 108, when executed by the processor 109, cause the driving simulator system 100 to display, on the central portion 105*a* (or the central screen) of the display 105, a lead vehicle 114 in front of the participant vehicle 110 on the roadway 111. Additionally, in one or more embodiments, the instructions stored in the non-volatile memory device 108, when executed by the processor 109, cause the driving simulator system 100 to signal an alert (e.g., an auditory and/or visual alert) in response to the participant vehicle 110 not remaining a preset distance (or within a range of preset distances, such as approximately 0 to approximately 42 m) from the lead vehicle 114. For instance, in one or more embodiments, the instructions stored in the non-volatile memory device 108, when executed by the processor 109, cause the driving simulator system 100 to display a red icon 110*d* (e.g., on the instrument panel 110*a* of the participant's vehicle 110) and emitting three beeps from the speaker 107 in response to the participant's vehicle 110 getting too far away from the lead vehicle 114 (e.g., exceeding approximately 42 m from the lead vehicle 114). In one or more embodiments, the driving simulator system 100 may be configured to signal an alert (e.g., an auditory and/or visual alert) in response to the participant's vehicle 110 not remaining within any other preset distance (or any other range of preset distances) from the lead vehicle 114. Additionally, in one or more embodiments, the instructions stored in the non-volatile memory device 108, when executed by the processor 109, cause the driving simulator system 100 to display a green icon 110*c* (e.g., on the instrument panel 110*a* of the participant's vehicle 110) in response to the participant vehicle 110 remaining at the preset distance (or within the range of preset distances, such as approximately 0 to approximately 42 m) from the lead vehicle 114.

Figure 2:
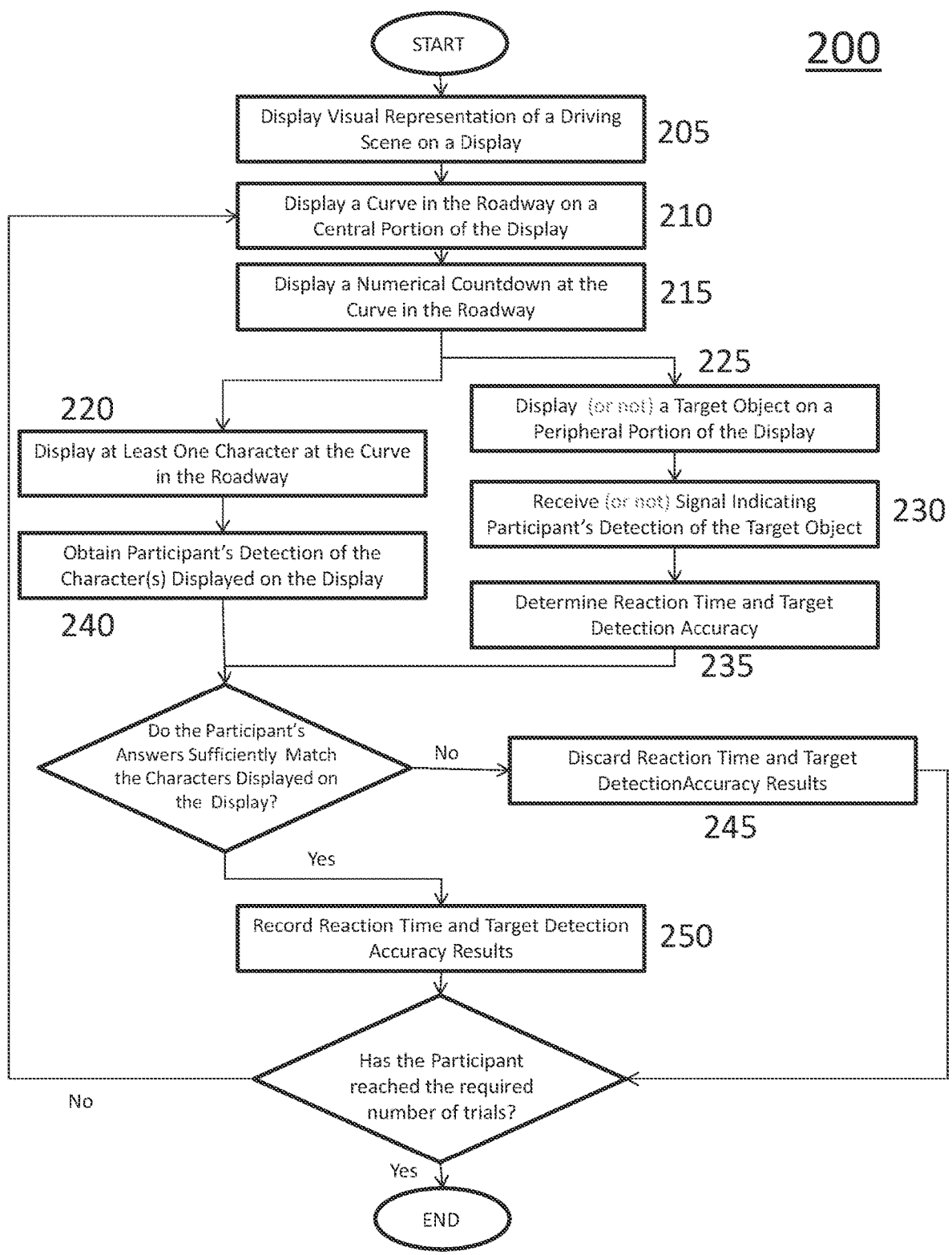
FIG. 2 is a flowchart illustrating tasks of a method of determining the impact of peripheral optical errors on patient driving according to one embodiment of the present disclosure utilizing the driving simulator system of FIGS. 1A and 1B.

FIG. 2 depicts a flowchart illustrating tasks of a method 200 of determining the impact of peripheral optical errors on patient driving according to one embodiment of the present disclosure utilizing the driving simulator system 100 of FIGS. 1A-1B.

In the illustrated embodiment, the method 200 includes a task 205 of displaying, on the display of the driving simulator system 100, a visual representation of a driving scene (e.g., a rural landscape) including a roadway. In one or more embodiments, the task 205 may also include displaying a visual representation of a vehicle on the roadway and the speed at which the vehicle is traveling on the roadway (e.g., task 205 may include displaying, on the display, an instrument panel, including a speedometer displaying the current speed of the vehicle on the roadway). In one or more embodiments, the visual representation of the vehicle displayed in task 205 may omit certain elements that could obstruct the participant's peripheral vision, such as the rearview mirror and/or the A-pillar (i.e., the windshield pillar). Additionally, in one or more embodiments, the visual representation of the vehicle displayed in task 205 may have a maximum speed (e.g., 70 km/h) when the participant has the accelerator pedal fully depressed.

In the illustrated embodiment, the method 200 also includes a task 210 of displaying a curve (e.g., a bend or a corner) in the roadway on the central portion (or the central screen) of the display. In one or more embodiments, the curve displayed in task 210 may be a left-hand or a right-hand curve. In one or more embodiments, the curves may alternate or vary (e.g., randomly vary) between left-handed and right-handed curves between subsequent performances of task 210.

In the illustrated embodiment, the method 200 also includes a task 215 of displaying, on the central portion (or the central screen) of the display, a countdown of numbers (e.g., 3-2-1) overlaid on (or proximate to) the curve in the roadway displayed in task 210. In one or more embodiments, the countdown of numbers displayed in task 215 may be overlaid on a tangent point of the curve in the roadway.

In the illustrated embodiment, the method 200 also includes a task 220 of displaying, on the central portion (or the central screen) of the display, at least one character (e.g., one or more letters) overlaid on (or adjacent or proximate to) each curve in the roadway after the numerical countdown displayed in task 215 reaches "1" and/or once the countdown is no longer displayed. In one or more embodiments, the task 220 may include displaying the at least one character overlaid on (or adjacent or proximate to) the tangent point (e.g., the geometric center) of the curve in the roadway. In one or more embodiments, the character(s) displayed in task 220 may be random or pseudorandom between subsequent performances of task 220.

In the illustrated embodiment, the method 200 also includes a task 225 of intermittently displaying, in a peripheral portion (or a peripheral screen) of the display, at least one target object simultaneously or substantially simultaneously with the display of the curve in the roadway in task 210. In one or more embodiments, the target object is displayed on fewer than all of the curves in the roadway to prevent the participant from being able to predict the presence of the target object without having to rely on their peripheral vision. In one or more embodiments, the display of the at least one target object in task 225 may move laterally from an outer peripheral portion of the display (or an outer peripheral portion of the peripheral screen) toward the central portion (or the central screen) of the display (e.g., the at least one target object may move from angle of approximately 45 degrees from the centerline of the participant's vision toward the centerline of the participant's vision). Additionally, in one or more embodiments, the task 225 of displaying the at least one target object in the peripheral portion (or a peripheral screen) of the display may be performed simultaneously or substantially simultaneously with the display of the at least one character (e.g., one or more letters) in task 220. In one or more embodiments, the target object displayed in task 225 may be, for example, a visual representation of a pedestrian or a cyclist. The numerical countdown displayed in task 215 and the at least one character displayed in task 220 are configured to occupy the participant's central vision such that the participant must rely on the participant's peripheral vision to notice the at least one target displayed in the peripheral portion (or a peripheral screen) of the display in task 225.

In the illustrated embodiment, the method 200 also includes a task 230 of receiving an input, via the indicator 106 of the driving simulator system 100, in response to the participant activating the indicator 106 (e.g., depressing a button, flipping a switch, or pressing a paddle) to indicate that the participant spotted a target object (e.g., a visual representation of a cyclist or a pedestrian) in the peripheral portion (or the peripheral screen) of the display.

In the illustrated embodiment, the method 200 also includes a task 235 of determining, by the processor of the driving simulator system 100, a reaction time between the display of the target object in task 225 and the receipt of the input from the indicator in task 230, and a ratio of the number of target objects detected by the participant to the total number of target objects displayed in the peripheral portion (or the peripheral screen) of the display (i.e., the participant's target detection accuracy). In one or more embodiments in which the at least one target object moves laterally inward in task 225, the task 235 may also include recording an angle at which the target object is located when the input is received in task 230.

In the illustrated embodiment, the method 200 also includes a task 240 of obtaining the participant's identification of the character(s) displayed in task 220 (e.g., task 240 may include an operator listening and recording the participant's verbal identification of the character(s) displayed in task 220).

In the illustrated embodiment, the method 200 includes a task 245 of discarding the reaction time and target detection accuracy results determined in task 235 in response to the participant not correctly identifying the character(s) displayed in task 220 and/or the vehicle not remaining in its lane during the curve displayed in 210. The participant's failure to correctly identify the character(s) displayed in task 220 or the vehicle veering outside of its lane indicate that the participant may have been diverting his or her central visual away from the central vision tasks to assist with the peripheral vision task (e.g., identifying the target object displayed in task 225) and therefore the reaction time and target detection accuracy results are discarded in task 245 if either of these conditions are not satisfied.

In the illustrated embodiment, the method 200 includes a task 250 of recording the reaction time and the target detection accuracy (and, optionally, the angle of the target object) determined in task 235 as valid in response to the participant correctly identifying the character(s) displayed in task 220 and the vehicle remaining in its lane during the curve displayed in 210. In general, the greater the reaction time and the smaller the angle of the target object with respect to the centerline of the participant's vision, the greater the extent of the impact of the peripheral optical errors on the participant's driving ability.

The tasks 205-250 may be repeatedly performed N times (where N is an integer) and one or more characteristics of the roadway may be varied between subsequent repetitions of tasks 205-250, such as whether the curve displayed in task 210 is a right-handed or a left-handed curve, the specific character(s) displayed at the curve in task 220, and whether or not a target object is displayed in the peripheral portion (or the peripheral screen) of the display in task 225.

Figure 3:
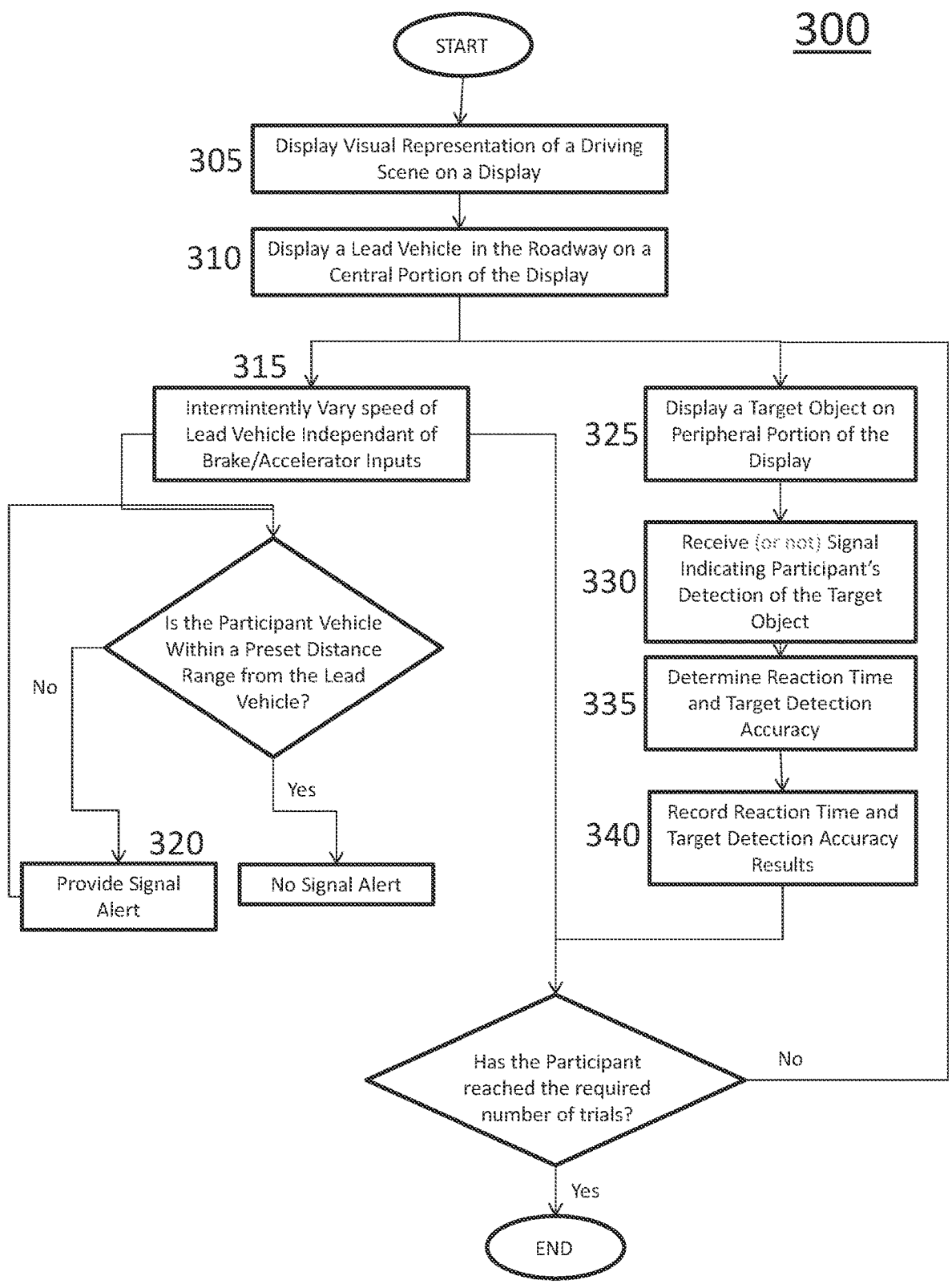
FIG. 3 is a flowchart illustrating tasks of a method of determining the impact of peripheral optical errors on patient driving according to another embodiment of the present disclosure utilizing the driving simulator system of FIGS. 1A and 1C.

FIG. 3 depicts a flowchart illustrating tasks of a method 300 of determining the impact of peripheral optical errors on patient driving according to another embodiment of the present disclosure utilizing the driving simulator system 100 of FIGS. 1A and 1C.

In the illustrated embodiment, the method 300 includes a task 305 of displaying, on the display of the driving simulator system 100, a visual representation of a driving scene (e.g., an urban or semi-urban scene) including a roadway. In one or more embodiments, the task 305 may also include displaying a visual representation of a vehicle on the roadway and the speed at which the vehicle is traveling on the roadway (e.g., task 305 may include displaying, on the display, an instrument panel, including a speedometer displaying the current speed of the vehicle on the roadway).

In the illustrated embodiment, the method 300 also includes a task 310 of displaying, on the central portion (or the central screen) of the display, a lead vehicle on the roadway in front of the participant's vehicle.

In one or more embodiments, the method 300 may include a task 315 of intermittently (e.g., periodically or randomly) changing the speed of the lead vehicle. In one or more embodiments, the task 315 may include randomly or pseudo-randomly varying the speed of the lead vehicle between 45-50 km/h. Varying the speed of the lead vehicle increases or decreases the distance between the participant vehicle and the lead vehicle, which then requires the participant to engage the brake pedal or the accelerator to increase or decrease the distance between the participant's vehicle and the lead vehicle to remain within the preset distance or the range of preset distances. In one or more embodiments, the method 300 may not include the task 315 of intermittently varying the speed of the lead vehicle.

In the illustrated embodiment, the method 300 also includes a task 320 of signaling an alert (e.g., an auditory and/or a visual alert) in response to the participant's vehicle not remaining within a preset distance (or a range of preset distances) from the lead vehicle displayed in task 310. For example, in one or more embodiments, the task 320 includes displaying a red icon (e.g., on the instrument panel of the participant's vehicle, as shown in FIG. 1C) and emitting three beeps in response to the participant's vehicle getting too far away from the lead vehicle. In one or more embodiments, the task 320 includes signaling an alert in response to the participant's vehicle being greater than 42.6 m (or approximately 42.6 m) from the leading vehicle. In one or more embodiments, the task 320 may include signaling an alert in response to the participant's vehicle not remaining within any other preset distance (or any other range of preset distances) from the lead vehicle.

In one or more embodiments, the task 315 may include increasing or decreasing the speed of the lead vehicle such that the participant's vehicle does not remain within the preset distance (or the range of preset distances) from the lead vehicle such that an alert is triggered in task 320. For example, in one or more embodiments, the task 315 may include intermittently (e.g., periodically, randomly, or pseudo-randomly) accelerating or decelerating the lead vehicle by 5 km/hr or more. In this manner, task 315 requires the participant to operate the accelerator pedal or the brake pedal to adjust the speed of the participant's vehicle to remain within the preset distance (or the range of preset distances) from the lead vehicle, which requires the participant to maintain focus on the central portion (or the central screen) of the display that displays the leading vehicle and speed of the participant's vehicle and thereby prevents (or at least mitigates against) the participant utilizing the participant's central vision to identify the target objects displayed in the peripheral portion (or the peripheral screen) of the display in a subsequent task of the method 300.

In the illustrated embodiment, the method 300 also includes a task 325 of intermittently (e.g., periodically or randomly) displaying, on the peripheral portion (or the peripheral screen) of the display, a target object. In one or more embodiments, the task 325 of intermittently displaying the target object may not be conditioned (dependent) on whether or not an alert is triggered in task 320. In one or more embodiments, the target object displayed in task 325 may be a visual representation of a pedestrian or a cyclist. In one or more embodiments, the target object displayed in task 325 may be a static target (e.g., the target may be displayed at a fixed location on the peripheral portion (or the peripheral screen) of the display). Additionally, in one or more embodiments, the position and/or the visual representation of the target object may vary between subsequent performances of task 325. For example, in one or more embodiments, the task 325 may include displaying, on the display of the driving simulator system 100, a target object selected (e.g., randomly selected) from the following: (i) a pedestrian at 20° left of the participant's visual axis; (ii) a pedestrian at 30° left of the participant's visual axis; (iii) a cyclist at 40° left of the participant's visual axis; (iv) a pedestrian at 20° right of the participant's visual axis; (v) a pedestrian at 30° right of the participant's visual axis; or a cyclist at 40° right of the participant's visual axis. Accordingly, in one or more embodiments, the target object displayed in task 325 appears to move laterally from an initial position (e.g., 20° left of the participant's visual axis) toward the outer peripheral portion of the display.

In the illustrated embodiment, the method 300 also includes a task 330 of receiving an input, via the indicator of the driving simulator system 100, in response to the participant activating the indicator 106 (e.g., depressing a button, flipping a switch, or pressing a paddle) to indicate that the participant spotted a target object displayed in the peripheral portion (or the peripheral screen) of the display in task 325.

In the illustrated embodiment, the method 300 also includes a task 335 of determining, by the processor of the driving simulator system 100, a reaction time between the display of the target object in task 315 and the receipt of the input from the selector in task 330, and a ratio of the number of target objects detected by the participant to the total number of target objects displayed in the peripheral portion (or the peripheral screen) of the display (i.e., the participant's target detection accuracy). In one or more embodiments, the task 335 may also include recording an angle at which the target object is located when the input is received in task 330.

In general, the greater the reaction time, the greater the extent of the impact of the peripheral optical errors on the participant's driving ability. For instance, a sufficiently long reaction time between the appearance of the target object and the input into the selector by the participant may indicate an insufficient braking distance between the participant's vehicle and the target object, which could result in a collision in real-world driving conditions. Additionally, the greater number of target objects that are not detected (i.e., missed) by the participant, the greater the extent of the impact of the peripheral optical errors on the participant's driving ability. In one or more embodiments, participants who had peripheral optical errors were 4.8 times more likely to miss a target object displayed in the periphery (or the peripheral screen) of the display than participants with suitable natural vision within the normal range for their age (i.e., individuals without peripheral optical errors).

In the illustrated embodiment, the method 300 includes a task 340 of recording the reaction time and target detection accuracy determined in task 335. In one or more embodiments, the method 300 may include the task 340 of recording the reaction time and target detection accuracy as valid only if the participant's vehicle remained at the preset distance (or within the range of preset distances) from the lead vehicle when the input is received in task 330 indicating that the participant spotted a target object displayed in the peripheral portion (or the peripheral screen) of the display. In one or more embodiments, the task 340 may not be performed (e.g., the reaction time and target detection accuracy determined in task 335 may be discarded) in response to the participant's vehicle not remaining at the preset distance (or within the range of preset distances) from the lead vehicle when the input is received in task 330. The vehicle moving outside of the specified distance (or the specified range of distances) from the lead vehicle indicates that the participant may have been diverting his or her central vision away from the central vision tasks to assist with the peripheral vision task (e.g., identifying the target object displayed in task 325) and therefore the reaction time result may be discarded if this condition is not satisfied.

The tasks 305-340 may be repeatedly performed N times (where N is an integer) and one or more characteristics of the test may be varied between subsequent repetitions of tasks 305-340, such as the position and/or the graphic representation of the target object.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof.

What is claimed is:

1. A method of quantifying an effect of peripheral optical errors on driving, the method comprising:
   displaying, on a central portion of at least one display of a driving simulator, a visual representation of a vehicle on a dynamic roadway;
   intermittently displaying, on the central portion of the at least one display, a curve of a plurality of curves in the dynamic roadway and at least one character at each curve of the plurality of curves and further comprising displaying, on the central portion, a numerical countdown at each curve of the plurality of curves prior to the displaying of the at least one character;
   intermittently displaying, on a peripheral portion of the at least one display of the driving simulator, a target object of a plurality of target objects, wherein the target object comprises moving the target object laterally toward the central portion of the at least one display;
   receiving, from an indicator in the driving simulator, a signal in response to a participant viewing the target object in the peripheral portion of the at least one display;
   determining, by a processor of the driving simulator, a reaction time between the displaying of the target object and the receiving of the signal;
   determining, by the processor of the driving simulator, target detection accuracy as a ratio of a number of target objects correctly detected by the participant to a total number of the plurality of target objects displayed; and
   quantifying the effect of the peripheral optical errors on driving based on the reaction time and the target detection accuracy.

2. The method of claim 1, further comprising obtaining a participant's identification of the at least one character.

3. The method of claim 2, further comprising discarding the reaction time in response to the participant not accurately identifying the at least one character.

4. The method of claim 1, further comprising disregarding the reaction time in response to the vehicle not remaining in a lane of the dynamic roadway during the curve in the dynamic roadway.

5. The method of claim 1, wherein the intermittently displaying the target object comprises moving the target object laterally toward the central portion of the at least one display.

6. The method of claim 1, wherein the target object is a visual representation of a pedestrian.

7. The method of claim 1, wherein the target object is a visual representation of a cyclist.

8. A method of quantifying an effect of peripheral optical errors on driving, the method comprising:
   displaying, on central portion of at least one display of a driving simulator, a participant vehicle and a lead vehicle in front of the participant vehicle on a roadway;
   signaling an alert, with the driving simulator, when the participant vehicle is outside of a distance range to the lead vehicle;
   intermittently displaying, on a peripheral portion of the at least one display of the driving simulator, a target object of a plurality of target objects, wherein the intermittently displaying the target object comprises varying a position of the target object between a plurality of discrete peripheral locations, wherein the plurality of discrete peripheral locations are selected from the group consisting of 20° left of the participant's visual axis; 30° left of the participant's visual axis, 40° left of the participant's visual axis, 20° right of the participant's visual axis; 30° right of the participant's visual axis, and 40° right of the participant's visual axis:
   receiving, from an indicator in the driving simulator, a signal in response to a participant detecting a target in the peripheral portion of the display;
   determining, by a processor of the driving simulator, a reaction time between the displaying of the target object and the receiving of the signal;
   determining, by the processor of the driving simulator, target detection accuracy as a ratio of a number of target objects correctly detected by the participant to a total number of the plurality of target objects displayed; and
   quantifying the effect of the peripheral optical errors on driving based on the reaction time and the target detection accuracy.

9. The method of claim 8, wherein the intermittently displaying the target object comprises varying the target object between a first visual representation of the target object and a second visual representation of the target.

10. The method of claim 9, wherein the first visual representation is a cyclist and the second visual representation is a pedestrian.

11. The method of claim 8, wherein the alert comprises a light having a first color on an instrument panel of the participant vehicle in response to the participant vehicle being too far from the lead vehicle.

12. The method of claim 8, further comprising intermittently changing a speed of the lead vehicle.

* * * * *